United States Patent [19]

Nomerange et al.

[11] Patent Number: 5,780,751

[45] Date of Patent: Jul. 14, 1998

[54] DEVICE FOR MEASURING TORQUES, ESPECIALLY FOR REDUCTION GEARING FOR ACTIVATING A FUNCTIONAL MEMBER OF A MOTOR VEHICLE

[75] Inventors: Hervé-Marcel Nomerange; Marie-Anne Gabrielle Lemperiere, both of Caen, France

[73] Assignee: Meritor Light Vehicle Systems, France

[21] Appl. No.: 679,499

[22] Filed: Jul. 11, 1996

[30] Foreign Application Priority Data

Jul. 11, 1995 [FR] France .................................. 95 08388

[51] Int. Cl.⁶ ...................................................... G01L 3/10
[52] U.S. Cl. ............................ 73/862.325; 73/862.321
[58] Field of Search ....................... 73/862.325, 862.321,
73/118.1, 862.326, 862.327, 862.328, 862.329;
318/488

[56] References Cited

U.S. PATENT DOCUMENTS

| | | | |
|---|---|---|---|
| 4,838,074 | 6/1989 | Morishita et al. | 73/862.325 |
| 4,856,323 | 8/1989 | Morishita et al. | 73/862.325 |
| 4,922,761 | 5/1990 | Onishi et al. | 73/862.325 |
| 4,967,858 | 11/1990 | Kotake et al. | 73/862.325 |
| 5,020,616 | 6/1991 | Yagi et al. | 73/118.1 |
| 5,533,410 | 7/1996 | Smith | 73/862.193 |

*Primary Examiner*—Ronald L. Biegel

[57] ABSTRACT

A device for measuring torques, especially for reduction gearing for activating a functional member of a motor vehicle, of the type including an electric motor (1) with permanent magnets, the output shaft (2) of which is connected to a worm (3) associated with a wheel (4), itself connected through means forming an elastically deformable damper (5) to an output member (6) of the reduction gearing, is characterized in that it includes means (9, 10) for determining angular displacements of the wheel and of the output member, these means being connected to means (8) for determining the resistive torques applied to this output member on the basis of the relative angular displacement between the wheel and the member.

8 Claims, 1 Drawing Sheet

DEVICE FOR MEASURING TORQUES, ESPECIALLY FOR REDUCTION GEARING FOR ACTIVATING A FUNCTIONAL MEMBER OF A MOTOR VEHICLE

BACKGROUND OF THE INVENTION

The present invention relates to a device for measuring torques, especially for reduction gearing for activating a functional member of a motor vehicle.

More specifically, the present invention relates to a device for measuring torques for reduction gearing of the type including an electric motor with permanent magnets, the output shaft of which is connected to a worm associated with a wheel, itself connected through means forming an elastically deformable damper to an output member of the reduction gearing.

Such devices are used, for example, in the electric window-lifter or sunshine roof assemblies of motor vehicles.

It is known that one of the most significant problems related to the operation of these assemblies is their operating safety, particularly the control of the operation thereof when some object becomes jammed, for example between a window glass and the rest of a door of the vehicle.

This operation can be controlled, for example, on the basis of the rotational speed of the output shaft of the drive motor for the assembly, of the current drawn thereby or alternatively the resistive torques applied to the output shaft thereof.

Indeed, torque-measuring devices are known which are inserted between two coaxial drive shaft portions connecting a driving member and a driven member for this type of assembly.

For example, torque-measuring devices are known which are inserted between two shaft portions connected to a driving member, such as an electric motor, and to a driven member, such as a worm and wheel mechanism for operating the window-lifter mechanism and which include two discs, arranged one facing the other in planes which are more or less perpendicular to the axis of the shaft's portions and bear at their periphery position-encoding means, each one connected to a shaft portion and connected one to the other by a buffer made of elastically deformable material, while position-detection means are arranged facing the position-encoding means of the discs.

The output from these position-detection means is connected to means for determining torques by analysing the information delivered by these position-detection means.

It is also known that the position-encoding means and the corresponding position-detection means can be formed by optical means or magnetic means.

However, the structure of these devices is such that it is necessary to provide two shaft portions between which these means are inserted.

Now, this may present a certain number of problems.

The object of the invention is therefore to solve these problems.

To this end, the subject of the invention is a device for measuring torques, especially for reduction gearing for activating a functional member of a motor vehicle, of the type including an electric motor with permanent magnets, the output shaft of which is connected to a worm associated with a wheel, itself connected through means forming an elastically deformable damper to an output member of the reduction gearing, characterized in that it includes means for determining angular displacements of the wheel and of the output member, these means being connected to means for determining the resistance of torques applied to this output member on the basis of the relative angular displacement between the wheel and the member.

BRIEF DESCRIPTION OF THE DRAWINGS

The invention will be better understood from reading the description which will follow, given only by way of example and made with reference to the attached FIG. 1 which represents an exploded perspective partial view of a torque-measuring device according to the invention.

DETAILED DESCRIPTION OF THE PREFERRED EMBODIMENTS

Figure 1:
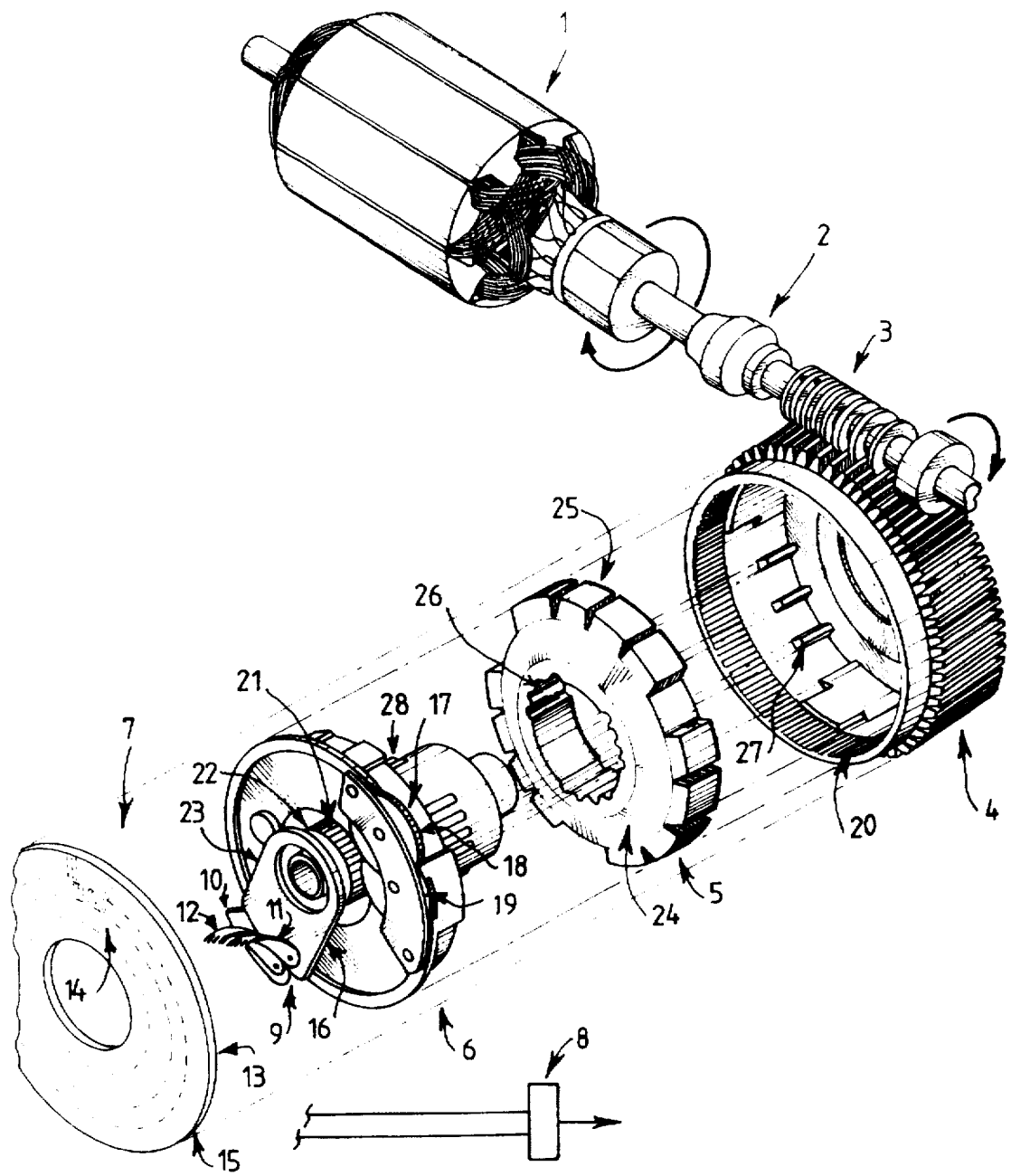

Indeed, in this figure, it is possible to recognize a torque-measuring device especially for reduction gearing for activating the functional member of a motor vehicle, such as a window-lifter.

This device includes an electric motor with permanent magnets denoted by the overall reference 1 in this figure, the output shaft 2 of which is connected to a worm 3 associated with a wheel 4.

This wheel 4 is itself connected through means forming elastically deformable damper 5 to an output member of the reduction gearing denoted by the overall reference 6.

According to the invention, this means includes means for determining the angular displacements of the wheel and of the output member, these means being connected to a means for determining the resistive torque applied to this output member on the basis of the relative angular displacement between the wheel and the member.

These means for determining the angular displacements of the wheel and of the output member are denoted by the overall reference 7 in the figure, while means for determining the resistive torque are denoted by the overall reference 8.

Advantageously, the means for determining the angular displacements comprise angular position encoders associated one with the wheel 4 and the other with the output member 6.

The angular position-encoder associated with the wheel 4 is denoted by the overall reference 9 in this figure, while the angular position-encoder associated with the output member 6 is denoted by the overall reference 10.

In fact, and according to the embodiment represented in this figure, the position-encoders may include wipers associated with encoded tracks of a disc fixed to the rest of the device.

Thus for example, the encoder 9 includes a first wiper 11, while the encoder 10 includes a second wiper 12.

These wipers are associated with tracks 13 and 14 respectively of a position-encoding disc 15 fixed to the rest of the device.

It will thus be understood that a first part of each encoder, that is to say for example, a wiper, is connected to a corresponding element, wheel or output member, and that a second part of each of these, that is to say for example an encoded track, is connected to a stationary part of the device.

Moreover, the first part of the encoder 10 is fixed directly to the output member 6, this first part being, for example, the wiper 12 of this encoder, while the first part of the other encoder 9, that is to say for example, the wiper 11 of this encoder, is mounted so that it can rotate on this output member 6 by means, for example, of a mounting piece denoted by the overall reference 16 in this figure, rotational-drive means arranged on this output member 6 being interposed between this mounting piece 16 and the wheel 4.

In this figure, these rotational-drive means are denoted by the overall reference 17 and comprise, for example, two gears 18 and 19 merging [sic] one with the other and one of which, 18, is associated with an internal toothed portion 20 of wheel 4 and the other of which, 19, is associated with a toothed portion 21 of the mounting piece 16.

In fact, these rotational-drive means constitute movement-amplification means making it possible to amplify the relative angular displacement between the wheel and the output member in order to improve the accuracy of the measurement device.

The mounting piece 16 includes, as may be seen in this figure, a hub 22 mounted so that it can rotate on the output member 6 and equipped with the toothed portion 21 interacting with the gear 19 and a radial arm 23 at the end of which the wiper 11 of the encoder 9 is fixed.

The means forming a damper 5 comprise, for their part, an elastic washer, for example of trapezoidal cross-section, denoted by the overall reference 24 in this figure, on the internal and external edges of which there are provided coupling rings 25 and 26 respectively, designed to interact with complementary means respectively 27, of the wheel 4, and 28, of the output member 6 of the reduction gearing.

It will thus be understood that the operation of this device is as follows.

The electric motor 1 via its output shaft 2 drags the worm 3 which causes the wheel 4 to turn.

This wheel, by means of the damping means 5 and of the corresponding complementary coupling means, causes the output member 6 to turn.

If no resistive torque is applied to this output member, the member forming a damper is not deformed or is deformed only very slightly and the wipers of the encoders 9 and 10 shift correspondingly.

By contrast, if a resistive torque is applied to this output member 6, the means forming a damper 5 deform so that there is relative angular displacement between the output member 6 and the wheel 4.

Since the wiper 12 of the encoder 10 is connected to this output member 6, and the mounting piece 16 for supporting the wiper 11 of the encoder 9 is associated with the wheel 4 via the movement-amplification means 17, the deformation of the means forming a damper results in an angular displacement of the mounting piece 16 and of the wiper 11, both associated with the wheel 4, with respect to the wiper 12 associated with the output member 6.

This then results in output data from these position-encoders which are off-set and represent the angular displacement between the wheel and the output member, so that the means 8 for determining the resistive torques can detect this off-set on the basis of this data and determine this torque on the basis of this off-set.

It will be noted that these means comprise any determining member which is known in the state of the art.

This then makes it possible to detect a resistive torque applied to the reduction gearing and to act on the operation thereof to ensure its operating safety, for example by reversing the direction of rotation thereof in order to avoid all risk of injury to a user whose hand, for example, might be jammed between a window glass and the rest of the door of the vehicle.

It will of course be noticed that various embodiments of this device may be envisaged and that the means for determining the angular displacements of the wheel and of the output member may be formed by means other than angular encoders with wipers and corresponding encoded tracks, such as by optical, magnetic or some other means for example.

The degree to which the displacement of one of the wipers is amplified depends on the transmission ratio of the set of meshing means provided between the wheel and the mounting piece and this ratio may, of course, be adjusted.

We claim:

1. A device for measuring torques, especially in a reduction gearing adapted for activating a functional member of a motor vehicle, said device comprising an electric motor, wherein said motor includes an output shaft, said output shaft being connected to a worm associated with a wheel, said wheel connected through an elastically deformable damper to an output member of the reduction gearing wherein said elastically deformable damper permits angular displacement between said wheel and said output member in response to a resistive torque being applied to said output member, wherein said torque measuring device includes means for determining angular displacement of the wheel relative to the output member, said displacement determining means being connected to means for determining the resistive torque applied to the output member as a function of the relative angular displacement between the wheel and the output member, wherein the means for determining the displacements comprise a pair of angular position encoders, one said encoder associated with the wheel and the other said encoder associated with the output member.

2. A device according to claim 1, wherein each encoder includes a first part connected to its corresponding element, wheel or output member, respectively, and a second part connected to a stationary portion of the device.

3. A device according to claim 2, wherein the first part of the encoder associated with the output member is fixed to a mounting piece, said mounting piece mounted so that it can rotate on the output member, wherein rotational drive means are arranged on the output member and interposed between the wheel and said mounting piece.

4. A device according to claim 3, wherein the rotational drive means comprise movement-amplification means.

5. A device according to claim 3, wherein said mounting piece has a radial arm having an end, and wherein the first part of the encoder associated with the output member is fixed to the end of the radial arm of the mounting piece so that it can rotate on the output member.

6. A device according to claim 5, wherein the movement-amplification means comprise two gears, one of which interacts with a toothed portion of the wheel and the other of which interacts with a toothed portion of the mounting piece.

7. A device according to claim 2, wherein the first part of each encoder includes a wiper and wherein the second part of each encoder includes an encoded track of a position-encoded disc.

8. A device for measuring torques, especially in a reduction gearing adapted for activating a functional member of a motor vehicle, said device comprising an electric motor, wherein said motor includes an output shaft, said output shaft being connected to a worm associated with a wheel, said wheel connected through an elastically deformable damper to an output member of the reduction gearing wherein said elastically deformable damper permits angular displacement between said wheel and said output member in response to a resistive torque being applied to said output member, wherein said torque measuring device includes means for determining angular displacement of the wheel relative to the output member, said displacement determining means being connected to means for determining the resistive torque applied to the output member as a function of the relative angular displacement between the wheel and the output member, wherein said elastically deformable damper comprises an elastic wiper of trapezoidal cross-section, said wiper having internal and external edges, on both the internal and external edges of which there are provided rings for coupling respectively to the wheel and to the output member.

* * * * *